United States Patent [19]

Nishida et al.

[11] Patent Number: 5,218,491
[45] Date of Patent: Jun. 8, 1993

[54] DISK DRIVE APPARATUS

[75] Inventors: Norio Nishida; Yoshihide Yamashita, both of Kanagawa, Japan

[73] Assignee: Sony Corporation, Tokyo, Japan

[21] Appl. No.: 719,770

[22] Filed: Jun. 24, 1991

[30] Foreign Application Priority Data

Jun. 26, 1990 [JP] Japan ................................. 2-168115

[51] Int. Cl.⁵ ............................................ G11B 19/20
[52] U.S. Cl. .............................. 360/73.03; 360/73.01
[58] Field of Search .......................... 360/73.05, 73.01; 318/270

[56] References Cited

U.S. PATENT DOCUMENTS 4,420,715 12/1983 Lecourtier et al. .
4,477,750 10/1984 Collins et al. .
4,780,773 10/1988 Hama ................ 360/73.03

FOREIGN PATENT DOCUMENTS 57-210481 3/1983 Japan .

Primary Examiner—Paul M. Dzierzynski
Assistant Examiner—Richard Hanig
Attorney, Agent, or Firm—Limbach & Limbach

[57] ABSTRACT

Disk drive apparatus for reproducing information signal from a disk on which the information signal and a servo sector pulse are recorded, which includes sampling circuit for sampling an output of a counter. A speed control signal is generated by detecting a difference between continuous sampling values, and a spindle motor is control by the speed control signal. When the rotational speed is slow, the sampling is performed by a detection output for the spindle motor, and when the rotational speed is nearly equal to a normal speed, that is performed by the sector pulse.

7 Claims, 4 Drawing Sheets

5,218,491

DISK DRIVE APPARATUS

BACKGROUND OF THE INVENTION

1. Field of the Invention

The present invention relates to a disk drive apparatus and, more particularly, to a disk drive apparatus employing a sector servo method.

2. Description of the Prior Art

Conventionally, for example, a servo control of a spindle motor which is used in a hard disk drive apparatus has been executed on the basis of a detection of an output of a Hall element or a detection of a back electromotive force of a coil of a motor.

Only a few pulses can be detected per one rotation by the detection of the output of the Hall element or the back electromotive force of the coil of the motor as mentioned above. Therefore, there is a problem such that only a coarse servo control can be executed and, further, in the case where a high precision servo control is required, the apparatus cannot cope with such a requirement. Therefore, although the use of a special FG or a rotary encoder is also considered, the costs increase and such a method is not suitable for miniaturization of the disk drive apparatus.

In a sector servo method which executes a control operation of a magnetic head on the basis of servo signals which are intermittently obtained from servo signal recording areas radially formed on a magnetic disk at equal angle intervals, a pulse signal which is intermittently derived every sector can be used as an FG. However, the magnetic head is located in a landing zone on the magnetic disk surface for a leading period of the rotation of the spindle motor, so that there is a problem such that a servo control cannot be executed.

OBJECTS AND SUMMARY OF THE INVENTION

It is, therefore, an object of the invention to provide a disk drive apparatus in which servo controls before and after a rising time point of the rotation of a spindle motor can be executed by a common master clock and a common circuit.

According to an aspect of the invention, there is provided a disk drive apparatus for reproducing information signal from a disk on which the information signal is recorded, and servo sector pulse is recorded at predetermined intervals in a direction of rotation, comprising, a spindle motor for driving rotatably the disk, means for detecting a rotation of the spindle motor and for generating a detection output, means for reproducing the sector pulse from the disk, means for switching the detection output and the sector pulses, a counter for counting a reference clock signal, sampling means for sampling an output of the counter by an output signal of the switching means, generating means for detecting a difference between continuous sampling values contained in an output of the sampling means and for generating a speed control signal, motor control means for controlling the spindle motor using the speed control signal, and control means for controlling the switching means responsive to a rotational speed of the disk so that switching means selects the detection output when the rotational speed is slow and selects the sector pulse when the rotational speed is nearly equal to a normal speed.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 2:
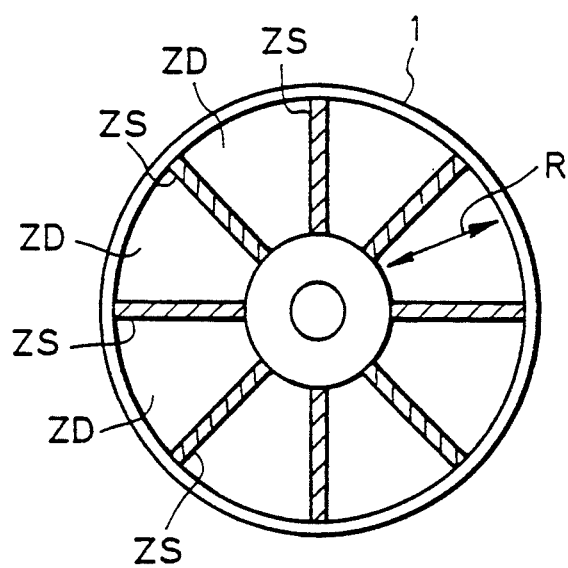
FIG. 2 is a diagram for explaining data zones and servo zones on a magnetic disk of the sector servo method.
Figure 3:
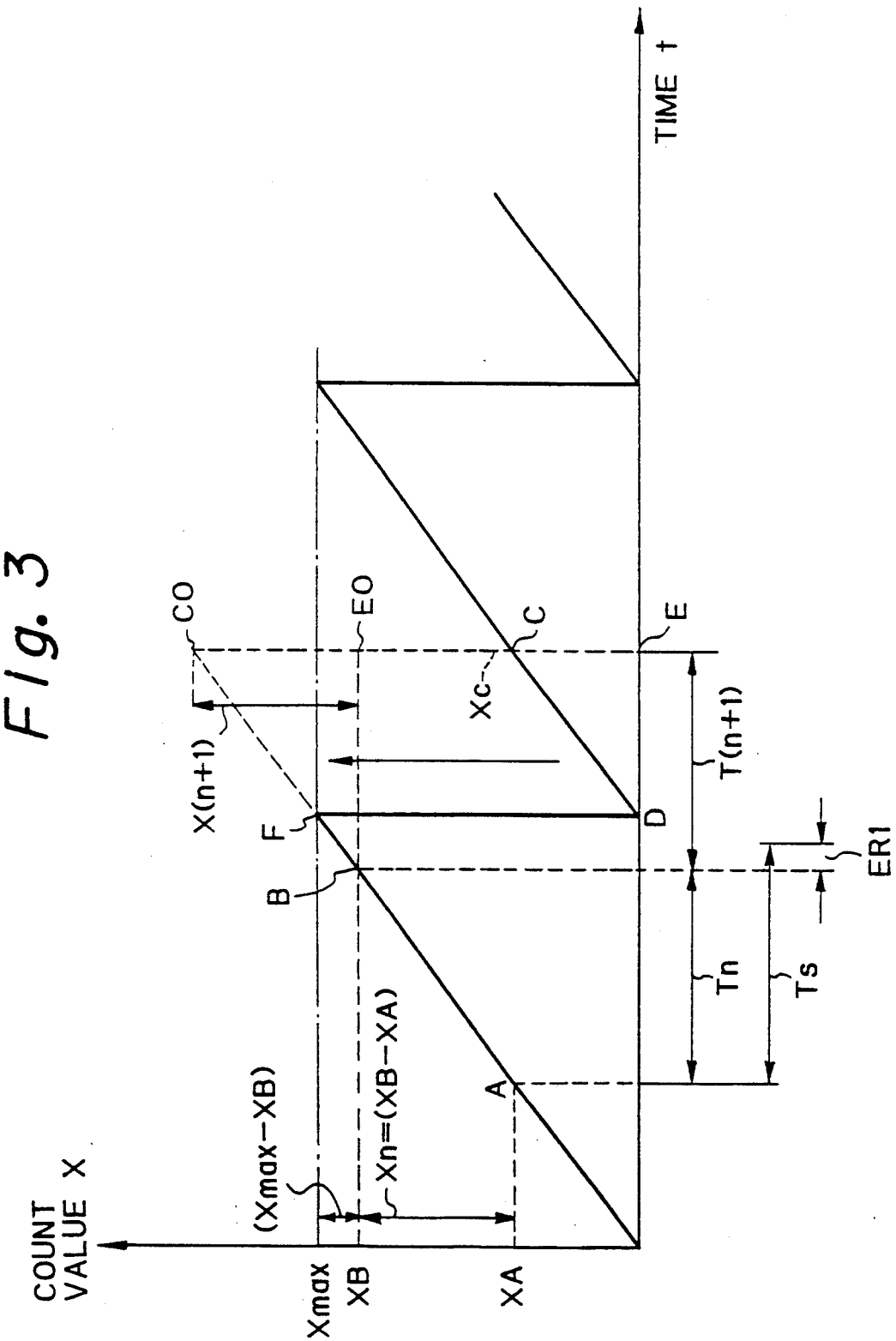
FIG. 3 is a diagram for explaining the circuit operation.

An embodiment of the present invention will be explained hereinbelow with reference to FIGS. 1 to 3. In the embodiment, a hard disk drive apparatus is described as an example of a disk drive apparatus.

Figure 1:
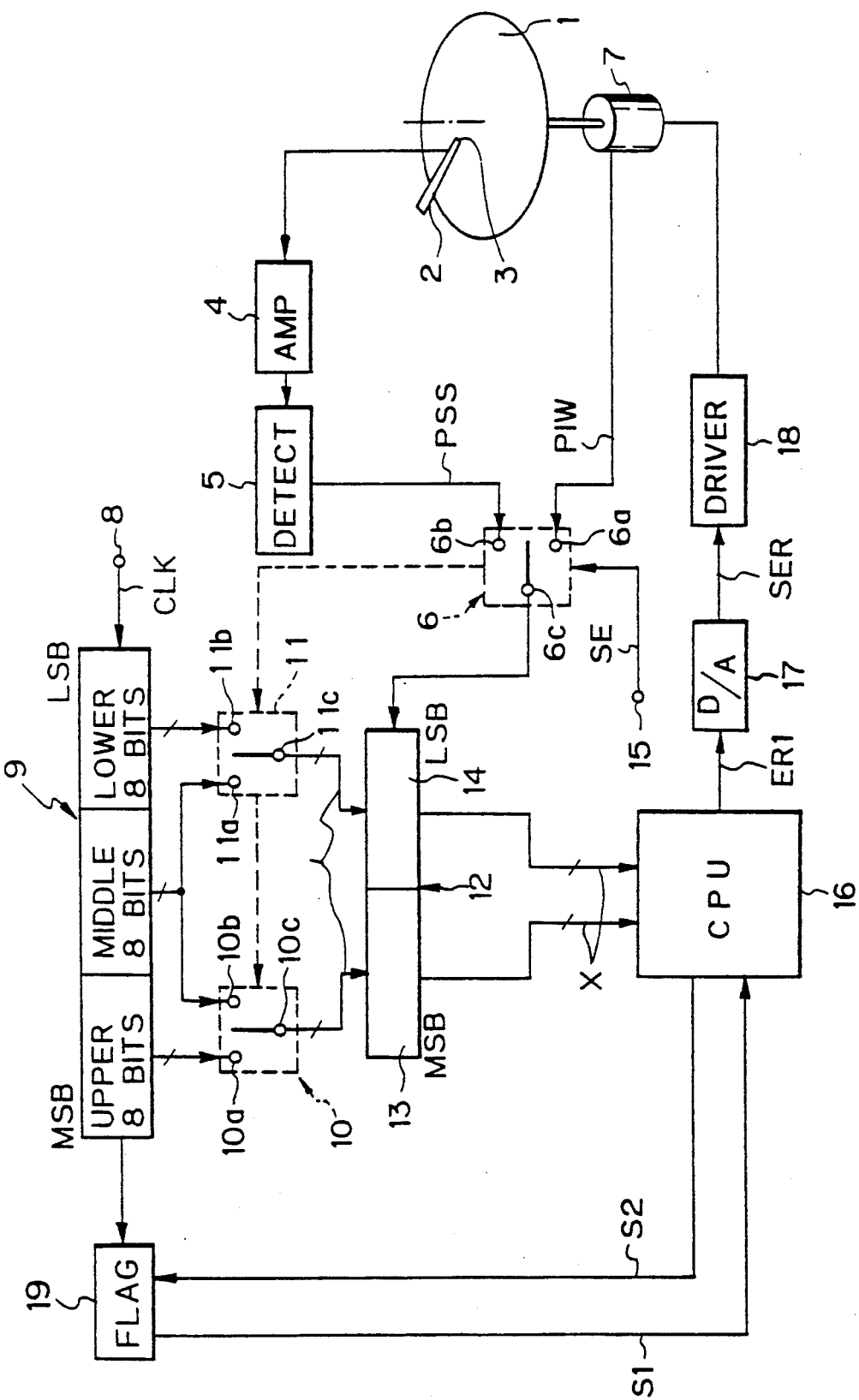
FIG. 1 is a block diagram of an embodiment to which the invention is applied.

In FIG. 1, 1 denotes a magnetic disk. The servo zones ZS are radially formed on a magnetic disk 1 at equal angle intervals as shown in FIG. 2. The data zones ZD are formed among the servo zones ZS. In the sector servo method, a servo signal is reproduced only in the case where a magnetic head 3 is located over the servo zone ZS. In the sector servo method, a control operation of the magnetic head 3 is executed on the basis of the servo signals which are intermittently obtained from the servo zones ZS.

In the construction of FIG. 1, when an arm 2 is rotated by a voice coil motor (not shown), the magnetic head 3 provided in a tip portion of the arm 2 is moved in the radial directions (directions shown by arrows R in FIG. 2) of the magnetic disk 1.

A reproduction output from the magnetic head 3 is supplied to a servo zone detecting circuit 5 through a head amplifier 4. The servo zone detecting circuit 5 detects whether the magnetic head 3 has been located in the servo zone ZS or not on the basis of the reproduction output from the magnetic head 3. When it is detected that the magnetic head 3 has been located in the servo zone ZS, a servo sector pulse PSS is supplied to a terminal 6b of a switch 6 from the servo zone detecting circuit 5.

A spindle motor 7 for rotating the magnetic disk 1 is provided under the magnetic disk 1. For example, a DC motor of three phases is used as a spindle motor 7. A back electromotive force pulse PIW are supplied to a terminal 6a of the switch 6 from the spindle motor 7. A Hall element can be provided for detecting rotational phase of the spindle motor 7, and Hall pulse from the Hall element can be used instead of the pulse PIW.

On the other hand, a master clock signal (simply referred to as a clock signal hereinbelow) CLK which is supplied through a terminal 8 is sent to a counter 9. The counter 9 is, for example, a free-run counter of 24 bits and a counting operation of the clock signal CLK mentioned above is always performed. Count values X as incremental values which are formed by the counting operation of the clock signals CLK are obtained. The counter 9 is used for a measurement of a rotational speed upon rising of the rotation of the spindle motor 7 and can assure a measuring accuracy in a stationary rotation.

Data is extracted from the counter 9 on an 8-bit unit basis of upper eight bits, middle eight bits, and lower eight bits, respectively. The upper 8-bit data is supplied to a terminal 10a of a switch 10. The lower 8-bit data is supplied to a terminal 11b of a switch 11. The middle 8-bit data excluding the upper and lower 8-bit data is supplied to terminals 10b and 11a of the switches 10 and 11, respectively.

The switches 10 and 11 mentioned above are connected to a capture register 12. A terminal 10c of the switch 10 is connected to a register 13 of the upper eight bits of the capture register 12. A terminal 11c of the switch 11 is connected to a register 14 of the lower eight bits of the capture register 12.

The switches 6, 10 and 11 are controlled by a selection signal SE which is supplied through a terminal 15 from a controller (not shown). The selection signal SE is set to, for example, the low level ("0") until the rotation of the spindle motor 7 sufficiently rises. The selection signal SE is set to, for example, the high level ("1") after the rotation of the spindle motor 7 sufficiently rose and the stationary rotation was derived and the servo sector pulses PSS was stably obtained.

The switches 6, 10, and 11 are constructed in a manner such that, for example, when the signal SE is at the low level ("0"), terminals 6a and 6c, 10a and 10c, and 11a and 11c are connected and that when it is at the high level ("1"), terminals 6b and 6c, 10b and 10c and 11b and 11c are connected.

The back electromotive force pulse PIW is supplied as a capture trigger to the capture register 12 until the rotation of the spindle motor 7 sufficiently rises. Data of upper and middle sixteen bits of the counter 9 is taken into the capture register 12 in parallel at a timing when the back electromotive force pulse PIW is supplied and the 16-bit data is supplied to a CPU 16 through the capture register 12.

At a stage at which the rotation of the spindle motor 7 sufficiently rises and the stationary rotation is derived and the servo sector pulse PSS is stably obtained, the servo sector pulse PSS which is supplied from the servo zone detecting circuit 5 is sent as a capture trigger to the capture register 12. The middle and lower 16-bit data of the counter 9 is taken into the capture register 12 in parallel at a timing when the servo sector pulse PSS is supplied and the 16-bit data is supplied to the CPU 16 through the capture register 12.

A resolution becomes coarse in the case where the upper and middle 16 bits of the counter 9 are selected. A resolution becomes fine in the case where the middle and lower 16 bits are selected. Generally, an interval of about (1/10) of the pulse interval of the back electromotive force pulses PIW is set to a pulse interval of the servo sector pulses PSS.

The CPU 16 detects a period of the capture trigger by using the count values X as a 16-bit data mentioned above and a reference count value Xs. In the period measurement, in the case where an overflow has occurred in the counter 9, a correcting process of the count value X is executed and, thereafter, the comparison between the difference of the count values X and the reference counter value Xs is performed. The reference count value Xs is changed in accordance with the kind and interval of the capture triggers which are supplied.

The period measurement of the capture trigger by the comparison between the count value X and the reference count value Xs will be described with reference to FIG. 3.

The case where no overflow occurs will be first described. FIG. 3 shows a state in the case where an axis of ordinate denotes the count value X of the counter 9 and an axis of abscissa indicates a time t. In FIG. 3, an alternate long and short dash line denotes a countable maximum count value Xmax. The count values do not overflow at the stages of points A and B as timing at which the capture trigger is supplied, so that there is no need to perform the correcting process.

Assuming that a count value at the point A is set to XA and a count value at the point B is set to XB, a difference Xn=(XB−XA) between the count values of the points A and B is obtained. The difference Xn corresponds to an interval Tn at which the capture trigger is supplied. On the other hand, a reference interval Ts derived from a reference rotational speed corresponds to the reference count value Xs. Therefore, a difference between the reference count value Xs and the difference Xn between the above count values is obtained as a servo error ER1.

The error ER1 mentioned above is converted into an analog error signal SER by a D/A converter 17 and is supplied to a driving circuit 18. The driving circuit 18 controls the rotational speed on the basis of the error signal SER in a manner such that the rotational speed of the spindle motor 7 is set to a value near the reference rotational speed.

The case where the overflow has occurred will now be explained.

When the count value of the counter 9 exceeds 24 bits and overflows, an overflow flag register (referred to as a flag register hereinbelow) 19 is set. A signal S1 indicative of the occurrence of the overflow is supplied to the CPU 16. In the case where the signal S1 has been supplied, if an arithmetic operation is directly performed, an error will occur. Therefore, the CPU 16 executes the correcting process of the count value X which is supplied from the capture register 12 and, thereafter, the CPU 16 supplies a signal S2 to the flag register 19 and resets the flag register 19.

The correcting process mentioned above is executed as follows. A difference (Xmax−XB) between the maximum count value Xmax of the counter 9 and the count values XB until the point B at which the capture trigger is supplied just before an overflow occurs is obtained.

A sum of the difference (Xmax−XB) between the count values and a count value XC at a point C is obtained in the point C of a timing when the next capture trigger is supplied. That is, a difference X(n+1)(=((Xmax− XB)+XC)) between the count values.

The operation will now be explained with respect to FIG. 3. The operation corresponds to that a triangle CDE is upwardly moved in parallel, a vertex D of the triangle CDE is overlaid on a point F, and a triangle BCOEO is formed, thereby obtaining the difference X(n+1) between the count values in an interval T(n+1) is obtained by using the sampling point B as a reference.

The difference X(n+1) between the count values corresponds to the interval T(n+1) at which the capture trigger is supplied. The error ER1 as a servo error amount is obtained and converted into the error signal SER. A step in which the rotational speed of the spindle motor 7 is controlled on the basis of the error signal SER is similar to that in the foregoing case of the interval Tn at which the capture trigger is supplied. Therefore, the overlapped explanations are omitted.

The interval at which the count value X of the counter 9 is sampled, that is, the interval at which the capture trigger is supplied becomes sequentially short in accordance with an increase in rotational speed of the spindle motor 7 when the rotation of the spindle motor 7 rises. Therefore, the count value X also sequentially decreases. On the other hand, the reference count value Xs is set to be constant. Therefore, when the rotation of the spindle motor 7 rises, a level of the error signal SER increases and a control voltage of a relatively high level is added to the spindle motor 7. The level of the error signal SER also decreases as the rotational speed of the spindle motor 7 increases and the control voltage which is applied to the spindle motor 7 gradually decreases.

Although the explanation has been made on the assumption that the reference count value Xs mentioned above is constant, the invention is not limited to the above example. The interval can be also changed, for example, in correspondence to change in period of the back electromotive force pulse PIW or sector pulse PSS.

According to the embodiment, upon rising of the rotation of the spindle motor 7, the count values X are sampled by the back electromotive force pulse PIW obtained from the spindle motor 7. The count values X are sampled by the servo sector pulse PSS in a state in which the rotation of the spindle motor 7 has sufficiently risen and the stationary rotation has been derived and the servo sector pulses PSS is stably obtained. The differences Xn and X(n+1) of the count values corresponding to the intervals at which the capture trigger is supplied are obtained. The rotational speed of the spindle motor 7 is controlled on the basis of the error ER1 which is formed from the differences Xn and X(n+1) of the count values and the reference count value Xs. Therefore, a coarse servo control based on the rotation detection output of the spindle motor which is executed when the rotation of the spindle motor 7 rises and a high precision servo control based on the reproduction output of the sector pulse which is performed after the rotation of the spindle motor became a stable state can be executed by a common master block and a common circuit.

In the embodiment, a range of the data in the counter 9 of 24 bits which is used depends on the pulse interval to be measured and a resolution of the counter 9 and can be arbitrarily selected in accordance with the specifications.

In the embodiment, middle and lower 16-bit data of the counter 9 is used in the case of measuring the period of the servo sector pulse PSS and upper and middle 16-bit data is used in the case of measuring the period of the back electromotive force pulse PIW. Consequently, it means that the interval of the back electromotive force pulse PIW is equal to an interval which is 256 times as long as the interval of the servo sector pules PSS.

Figure 4:
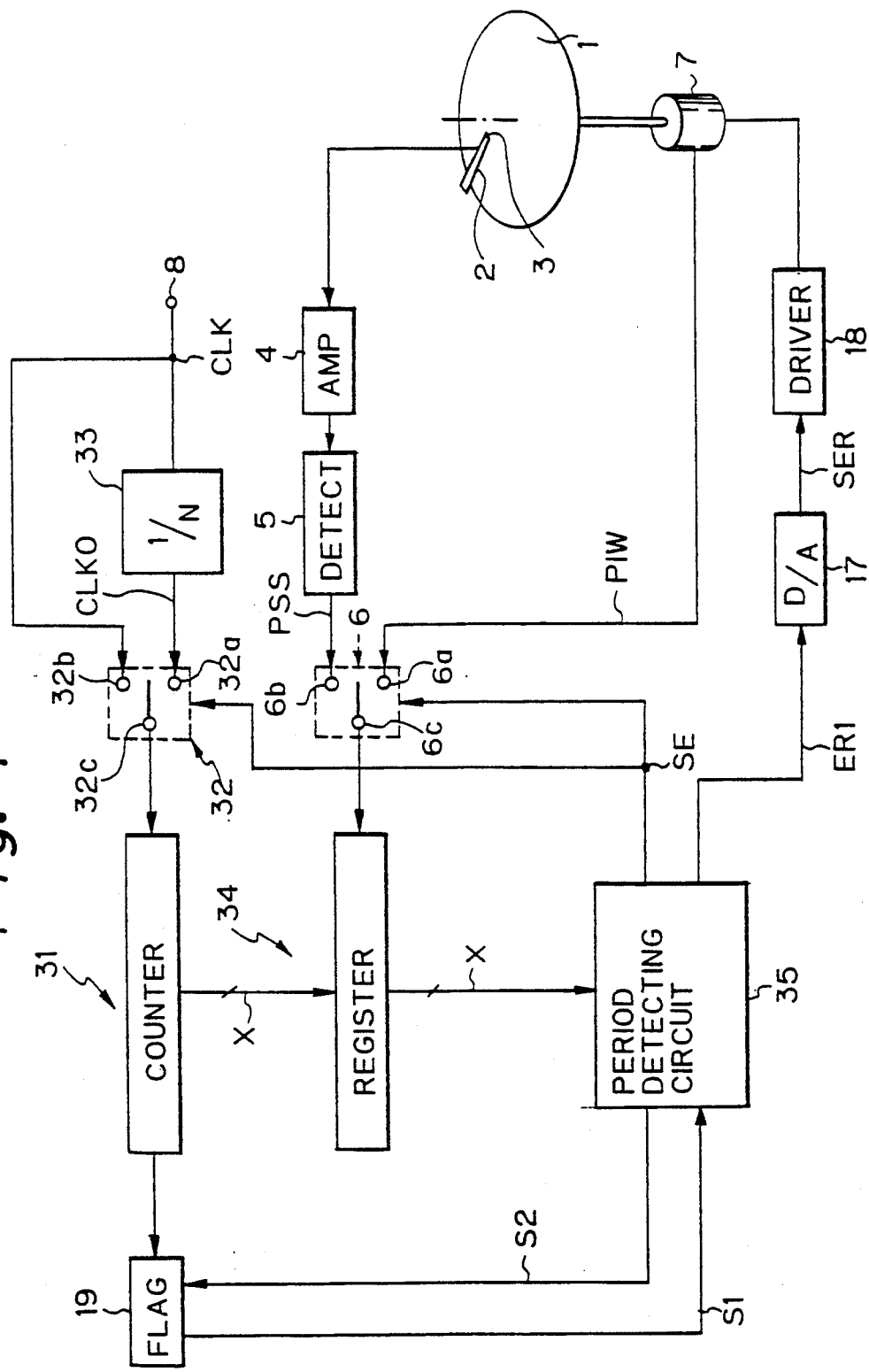
FIG. 4 is a block diagram of another embodiment.

Another embodiment of the invention will now be described with reference to FIG. 4.

Another embodiment differs from the embodiment mentioned above with respect to the following point. That is, a resolution for detecting period is switched based on frequency of a clock which is supplied to a counter 31. Portions which are common to those in the above embodiment are designated by the same reference numerals and their overlapped descriptions are omitted.

The clock signal CLK which is supplied through the terminal 8 is sent to the counter 31 through a switch 32 and is transferred to a frequency dividing circuit 33. The frequency dividing circuit 33 frequency divides the clock signal CLK at a predetermined frequency dividing ratio N and, thereafter, supplies to the switch 32. The frequency dividing ratio N is set, for example, a ratio of the intervals of the back electromotive force pulse PIW to the servo sector pulses PSS in the foregoing embodiment, namely, 256. The counter 31 is a freerun counter of 16 bits and the counting operation of the clock signal CLK is always being executed. The counter 31 is connected to a latch 34 and the 16-bit data can be extracted in parallel. The count value X of 16 bits extracted from the latch 34 is supplied to a period measuring circuit 35.

The switches 6 and 32 are controlled by the selection signal SE which is supplied from the period measuring circuit 35. The selection signal SE is set to, for example, the low level ("0") until the rotation of the spindle motor 7 sufficiently rises. The selection signal SE is set to, for example, the high level ("1") after the rotation of he spindle motor 7 sufficiently rose and the stationary rotation was derived and the servo sector pulse PSS was stably obtained.

The switches 6 and 32 are constructed in a manner such that, for example, when the signal SE is at the low level ("0"), terminals 6a and 6c and 32a and 32c are connected and that when it is at the high level ("1"), the terminals 6b and 6c and 32b and 32c are connected. Thus, a clock signal CLKO which has been frequency divided at the predetermined frequency dividing ratio N is supplied to the counter 31 until the rotation of the spindle motor 7 sufficiently rises. The back electromotive force pulse PIW which is formed by the spindle motor 7 is supplied as a capture trigger to the latch 34. The counter 31 counts the clock signal CLKO which has been frequency divided.

The 16-bit data of the counter 31 is latched into the latch 34 at the timing at which the back electromotive force pulse PIW is supplied and the 16-bit data is supplied to the period measuring circuit 35 through the latch 34.

At a stage at which the rotation of the spindle motor 7 sufficiently rises and the stationary rotationa is derived and the servo sector pulse PSS is stably obtained, the clock signal CLK which is not frequency divided is supplied to the counter 31 and the servo sector pulse PSS which is supplied from the servo zone detecting circuit 5 is sent as a capture trigger to the latch 34. The counter 31 counts the clock signal CLK which is not frequency divided.

The 16-bit data of the counter 31 is latched into the latch 34 in parallel at the timing at which the servo sector pulse PSS is supplied. The 16-bit data is supplied to the period measuring circuit 35 through the latch 34.

The error ERI which has been obtained by the period measuring circuit 35 in a similar manner to that of the above embodiment, is converted into the analog error signal SER by the D/A converter 17 and is supplied to the driving circuit 18. The driving circuit 18 controls the rotational speed of the spindle motor 7 in accordance with the error signal SER.

Since the other contents are similar to those in the foregoing embodiment, their overlapped explanations are omitted.

Although the embodiment has been described with respect to the hard disk drive apparatus as an example, the invention is not limited to such an example. The invention can be also applied to, for example, a floppy disk drive apparatus, a drive apparatus of a magneto-optical disk using a sample format, or the like.

According to the disk drive apparatus of the invention the output of the counter is sampled by either one of the rotation detection output of the spindle motor and the reproduction out of the sector pulses recorded on the disk at predetermined intervals. The error is formed by comparing the difference between the sample count values, namely, continuous values with a predetermined reference value. The speed of the spindle motor is controlled on the basis of the error. Therefore, there is an effect such that the coarse servo control based on the rotation detection output of the spindle motor which is executed when the rotation of the spindle motor rises and the high precision servo control based on the reproduction output of the sector pulse after the rotation of the spindle motor became a stable state can be executed by the common master clock and the common circuit. Due to this, there is an effect such that the number of parts can be reduced and the costs can be reduced.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. Disk drive apparatus for reproducing information signal from a disk on which said information signal is recorded, and a servo sector pulse is recorded at predetermined intervals in a direction of rotation, comprising:
   a spindle motor for driving rotatably said disk;
   means for detecting a rotation of said spindle motor and for generating a detection output;
   means for reproducing said sector pulse from said disk;
   means for switching said detection output and said sector pulse;
   a counter for counting a reference clock signal;
   sampling means for sampling an output of said counter by an output signal of said switching means;
   generating means for detecting a difference between continuous sampling values contained in an output of said sampling means and for generating a speed control signal;
   motor control means for controlling said spindle motor using said speed control signal; and
   control means for controlling said switching means responsive to the rotational speed of said disk so that said switching means selects said detection output when said rotational speed is slow and selects said sector pulse when said rotational speed is nearly equal to a normal speed.

2. Disk drive apparatus according to claim 1, wherein said generating means includes a comparing means for comparing said difference between continuous sampling values with a reference value.

3. Disk drive apparatus according to claim 1, wherein said sampling means includes a latch means for latching the output of said counter.

4. Disk drive apparatus according to claim 1, wherein said counter includes a detecting means for detecting its overflow which supplies a detection signal with said generating means, and said speed control signal is corrected by said detection signal.

5. Disk drive apparatus according to claim 1, wherein said detecting means includes a means for detecting a back electromotive force of said spindle motor.

6. Disc drive apparatus according to claim 1, wherein said counter is constituted as a multi-bit counter, and said sampling means samples the output of selected different bit position of said counter which is controlled selectively by said control means.

7. Disk drive apparatus according to claim 1, wherein said counter has a first mode for counting said reference clock signal and a second mode for counting a frequency dividing signal of said reference clock signal, and said first and second modes are switched by the output of said control means.

* * * * *